Oct. 8, 1968   L. K. EDWARDS   3,404,638
HIGH-SPEED GROUND TRANSPORTATION SYSTEMS
Filed July 21, 1965   8 Sheets-Sheet 1

Oct. 8, 1968  L. K. EDWARDS  3,404,638
HIGH-SPEED GROUND TRANSPORTATION SYSTEMS
Filed July 21, 1965  8 Sheets-Sheet 2

Oct. 8, 1968 L. K. EDWARDS 3,404,638
HIGH-SPEED GROUND TRANSPORTATION SYSTEMS
Filed July 21, 1965 8 Sheets-Sheet 8

United States Patent Office 3,404,638
Patented Oct. 8, 1968

3,404,638
HIGH-SPEED GROUND TRANSPORTATION
SYSTEMS
Lawrence K. Edwards, Palo Alto, Calif., assignor to Lockheed Aircraft Corporation, Sunnyvale, Calif.
Filed July 21, 1965, Ser. No. 473,726
30 Claims. (Cl. 104—156)

ABSTRACT OF THE DISCLOSURE

A high-speed ground transportation system in which a vehicle, typically consisting of a train of detachably coupled cars, is propelled as a free piston through a duct by differential air pressure on the ends of the vehicle, the differential pressure being obtained by evacuation of air from the duct ahead of the vehicle and delivery of air to the duct rearward of the vehicle. The duct is floatingly mounted in an underground tunnel by either floating the duct in a body of water contained within the tunnel or by resiliently supporting the duct by spring means interconnecting the duct and tunnel. The connections between cars of the vehicle are nonarticulated rigid connections, and the vehicle is a wheeled vehicle, traveling on rails in the duct, with provisions for raising one or more of the wheels out of engagement with the rails upon the occurrence of a wheel malfunction.

---

This invention relates to high-speed ground transportation systems, and more particularly to pneumatic systems of this class.

The invention is particularly concerned with systems for high-speed intercity mass transportation as, for example, on the Washington, D.C., New York, N.Y. and Boston, Mass. route (in the so-called Northeast Corridor), and for high-speed intra-urban mass transportation, as are presently needed and will be even more urgently needed in the near future. It contemplates, for example, trains of capacity up to 1,500 passengers traveling at speeds up to 500 m.p.h. and even up to 700 m.p.h. over longer distances in intercity transportation, and trains of capacity up to 6,000 passengers traveling at speeds up to 350 m.p.h. over distances of 5 to 30 miles in intra-urban mass transit.

Among the several objects of the invention may be noted the provision of a high-speed ground transportation system which is relatively economical to construct and operate for its passenger-handling potential in relation to construction and operating costs of highways, conventional railroads and subways, and in relation to construction and operating costs attendant upon air travel; and the provision of such a system in which a vehicle, typically consisting of a train of detachably-coupled cars, is propelled as a free piston through a tube or duct by differential pressure of air between the front and rear of the vehicle, the differential pressure being attained by evacuation of air from the duct ahead of the vehicle and delivery of air at atmospheric or other suitable pressure to the duct rearward of the vehicle. By reducing the pressure of air in the duct ahead of the vehicle to the order of 1 p.s.i., speeds up to 700 m.p.h. may be attained. Typically, the duct for the vehicle will be located underground by tunneling, at substantial depths below the surface, although the duct is certain instances or over certain portions of its length may be on the surface.

There have been prior proposals for systems in which a vehicle is propelled through a tube or duct by equipment on board the vehicle and involving supporting the vehicle on pressurized air ejected from the bottom of the vehicle. In such proposed systems, the on-board equipment, including the pumping system for ejection of pressurized air, is costly, heavy, bulky and operationally complex, in view of the necessity for relatively precise positioning of the vehicle in the duct despite variations in vehicle speed and loading and shifts in loading. Accordingly, a further object of this invention is the provision of an improved pneumatic duct type transportation system in which the vehicle is a wheeled vehicle, traveling on rails in the duct, and which is externally powered so as to eliminate any necessity for on-board power equipment (except such equipment as electrical generators for vehicle lighting, air conditioning etc.).

In view of the use of a wheeled vehicle traveling on rails in the duct, a further object of the invention is the provision of a supporting system for the duct which is capable of safely accommodating travel of the wheeled vehicle at high speeds (e.g., 300–700 m.p.h.), and which minimizes noise, vibration and shocks which would otherwise be attendant upon high-speed travel so as to satisfy requirements of passenger comfort and reduction of wear and tear on the vehicle and the duct and rail structure. Also, the duct supporting system is such as to provide for precise alignment and leveling of the duct at low cost and, as regards location of the duct underground in a tunnel, to eliminate any necessity for highly precise tunneling, enabling construction of the tunnel to be carried out at relatively low cost. Moreover, the duct supporting system is such as to maintain alignment of the duct despite minor earth shifts as may occur due to erosion, earthquake or other causes.

Also, in view of the use of a wheeled vehicle traveling at high speed on rails in the duct, a further object of the invention is the provision of a wheeled car, which is adapted for detachable coupling in a train of such cars, with means for avoiding the danger that might otherwise result from locking (freezing) of wheel bearings. In this regard, means is provided for sensing in advance any tendency for freezing of a wheel and for raising the wheel out of engagement with the respective rail, and the car is so constructed and so connected with another car or cars in the train as to enable this to be accomplished without disabling the train, which may proceed to its destination, at reduced speed if necessary. For this purpose, and for other purposes that will appear, the connections between cars of the train are nonarticulated rigid connections, and a further object of the invention is the provision of a construction for the wheeled car such that a train of the cars may travel around curves with acceptable lateral loads on the wheels despite the nonarticulated connection of the cars.

A further object of the invention is the provision of a pneumatic system for effecting evacuation of air from the duct ahead of the vehicle and delivery of air to the duct rearward of the vehicle for propulsion of the vehicle with high efficiency, with a minimum number of primary pumping stations spaced at considerable distances along the route. This pneumatic system is such that air for propulsion of the vehicle is stored relatively closely adjacent the point of use, avoiding any necessity for moving large amounts of air considerable distances at high speed. It may also be such that evacuation of air from the duct ahead of a vehicle may be carried out without any necessity for moving large amounts of air considerable distances at high speed, despite the spacing of the primary pumping stations at considerable distances along the route.

Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated.

Corresponding reference characters indicate corresponding parts throughout the several views of the drawings.

Referring to the drawings, first more particularly to FIGS. 1–4, a high-speed ground transportation system of this invention is shown to comprise a tube or duct 1 adapted for propulsion of a vehicle 3 as a free piston therein by establishing differential air pressure between the front and rear of the vehicle in the duct. As shown in FIGS. 1–4, the duct extends underground through a tunnel 5 betwene terminals T1 and T2. These terminals are shown as being at the surface, although they could be underground, and the tunnel 5 and the tube 1 are accordingly shown as having a horizontal intermediate reach 1a which may be located relatively deep underground, and sloping terminal reaches 1b from the ends of the horizontal reach to the terminals T1 and T2. The horizontal reach 1a may be straight throughout its length, or may have straight sections joined by curves of relatively long radius. The vehicle 3 is adapted to be propelled through the duct 1 at high speed by evacuation of air from the duct ahead of the vehicle, and delivery of air at suitable pressure rearward of the vehicle. It is contemplated that air in the duct 1 ahead of the vehicle may be evacuated down to a pressure of the order of 1 p.s.i. for propulsion of the vehicle at speeds up to 700 m.p.h. Air may be delivered rearward of the vehicle at pressure somewhat higher than atmospheric pressure, or at atmospheric pressure, for example.

Location of the duct 1 underground in a tunnel for most if not all of its length is preferred in respect to considerations of levelness of the duct, problems of acquisition of right-of-way, and esthetic factors. The tunnel may be constructed by conventional modern tunneling techniques, and, at the depths contemplated therefor, would be bored through bedrock for most of its length. Modern hard-rock tunnelers are available, capable of boring a clean-bored tunnel twelve feet in diameter through relatively hard rock at the rate of two to five feet per hour, without any necessity for blasting. Under certain conditions, the tunnel need not be lined, particularly if a smooth bore of moderate precision has been obtained by such a tunneler. However, the tunnel would more typically be lined with concrete, as indicated at 7 in FIGS. 3 and 4, or with metal lining plates or the like. The tunnel construction in any event should be such as to resist entry of ground water into the tunnel, although some water penetration would not be catastrophic. Precision tunneling is not required in view of the mode of supporting duct 1 within the tunnel as will appear; it is not necessary that the tunnel be nicely smooth-walled, and the tolerances in respect to its straightness, diameter and roundness may be wide.

Figure 1:
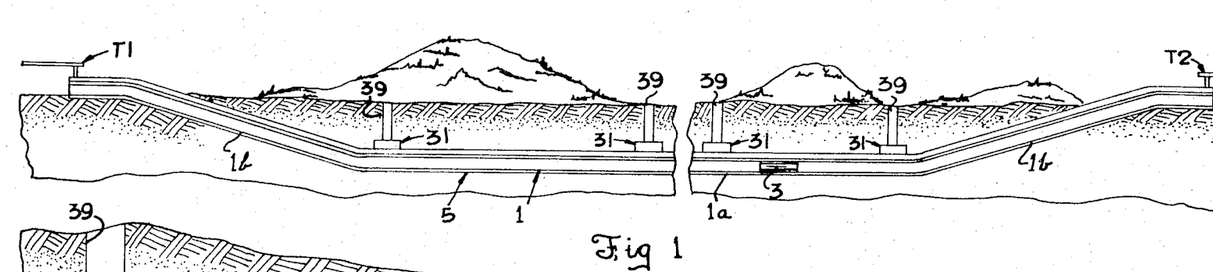
FIG. 1 is a view in section, partly broken away, showing a high-speed ground transportation system of this invention.
Figure 2:
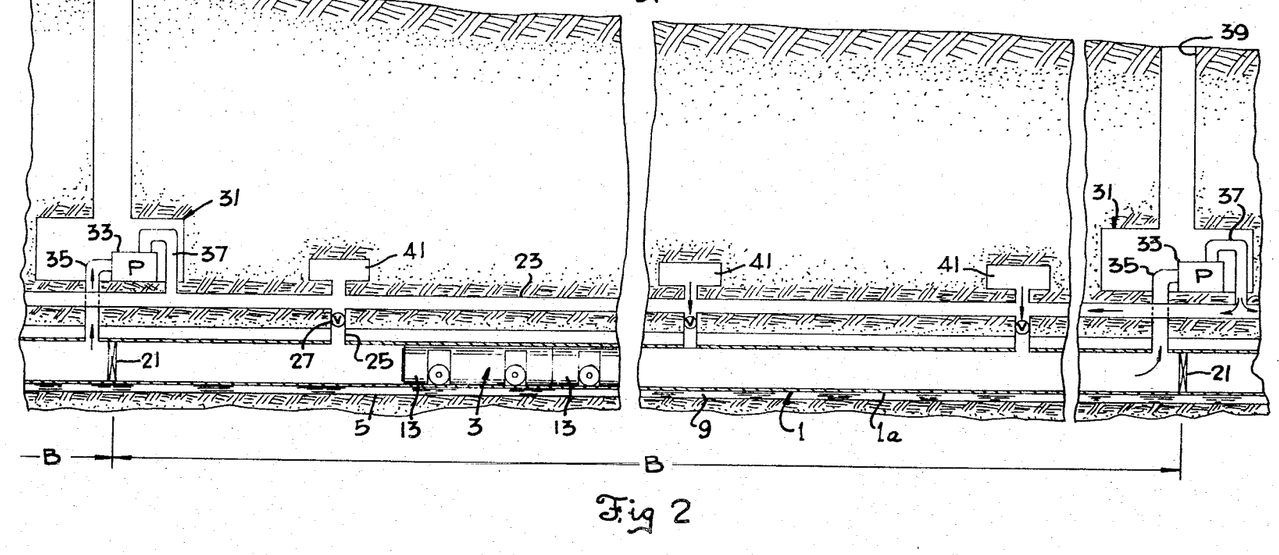
FIG. 2 is an enlarged fragment, partly broken away, of FIG. 1.
Figure 3:
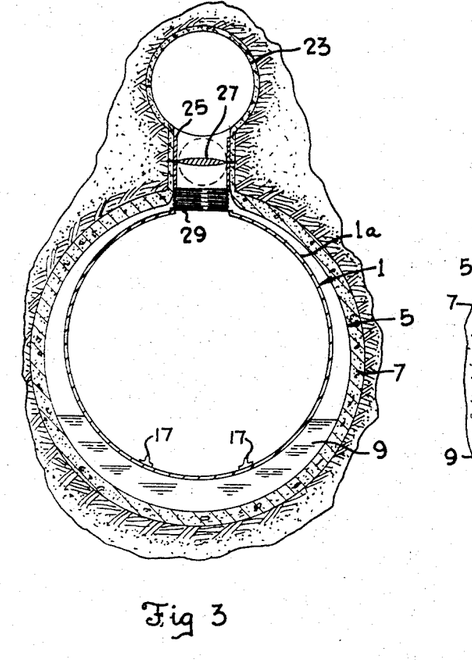
FIG. 3 is an enlarged transverse section through a tunnel and vehicle duct.
Figure 4:
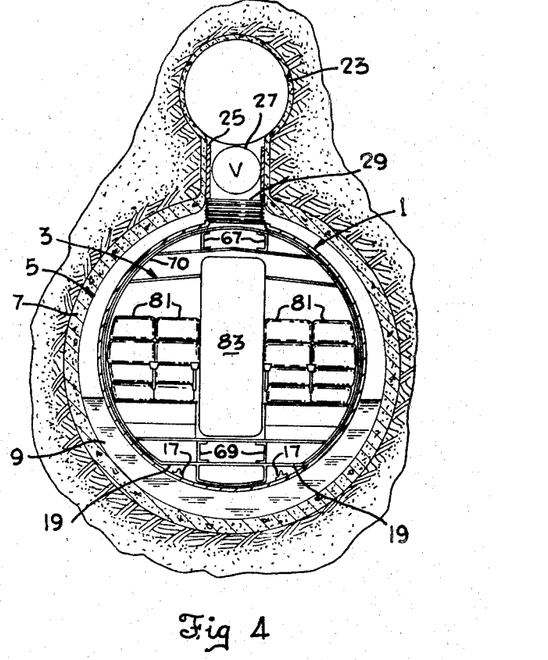
FIG. 4 is a section similar to FIG. 3 also taken through a vehicle.
Figure 5:
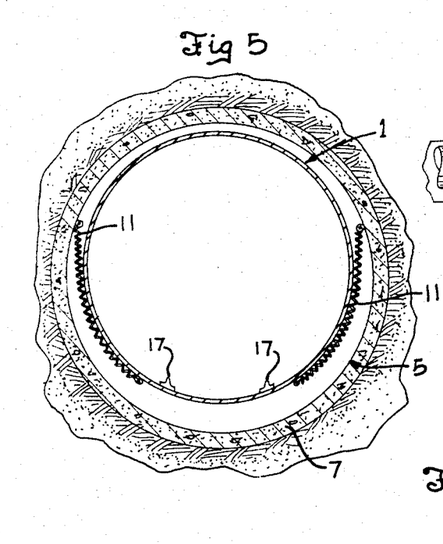
FIG. 5 is an enlarged transverse section showing a mode of mounting the vehicle duct in an inclined reach.
Figure 6:
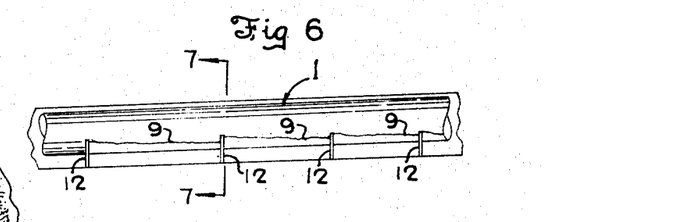
FIG. 6 is a longitudinal section showing an alternative mode of mounting the vehicle duct in an inclined reach.
Figure 7:
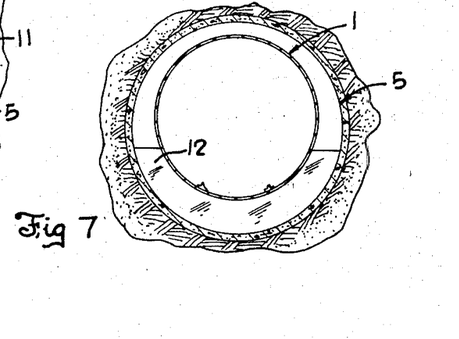
FIG. 7 is an enlarged transverse section taken on line 7—7 of FIG. 6.

The duct 1 consists essentially of an air-tight metal tube which, as illustrated in FIGS. 3 and 4, may be of circular cross section. Whatever its cross-sectional shape, the duct is of smaller cross section than the tunnel 5, which may be referred to as the outer tube, and, in accordance with this invention, the duct 1 is floatingly mounted in the tunnel or outer tube 5 providing for cushioned suspension of the duct 1 with respect to the tunnel 5 substantially throughout its length. As shown in FIGS. 2–4, the horizontal reach of the duct is floatingly mounted in the horizontal reach 1a of the tunnel or outer tube 5 by floating it in a body of liquid 9 maintained in the tunnel. Typically, the liquid used for flotation of the tube would be water, but other liquids (e.g., kerosene) or semi-liquids (e.g., asphalt) may be used. As shown in FIG. 5, the sloping reaches of the duct in the sloping terminal reaches of the tunnel or outer tube 5 may be floatingly mounted by means of springs such as tension springs 11 suspending the duct within the outer tube 5. Alternately, as shown in FIGS. 6 and 7, the inclined reaches of the duct may be floatingly mounted in liquid 9 by providing flexible dams (e.g. rubber dams) such as indicated at 12 spaced at suitable intervals as determined by the slope of the duct for impounding pools of liquid for flotation of the duct. This provides a stepped pool arrangement approximately the slope of the duct. It may be desirable to provide a continuous supply of liquid at the upper end of the slope to replenish loss of liquid from the pools due to evaporation or sloshing. On smaller slopes, it may be possible to omit the dams, and simply provide a continuous moderate flow of liquid from the upper end to the lower end of the slope to maintain a pool in the outer tube 5 for flotation of the duct 1. Using water as the flotation medium, this may be utilized in conjunction with useful transmission of the water from a mountainous area to a lower arid area.

As shown in FIGS. 2 and 15–17, the vehicle 3 comprises a train of cars each designated 13. Each car is of special construction in accordance with this invention, and has wheels 15 each having a special mounting on the car in accordance with this invention. The wheels ride on rails 17 which extend lengthwise of the duct 1 along its bottom. The cross section of each car corresponds substantially to that of the duct, with recesses 19 to accommodate the rails, so that the vehicle or train 3 may be effectively propelled as a free piston in the duct. A cylindrical form is preferred for the duct and hence for the cars.

The flotation of the duct 1, which has rails 17 for travel of the wheeled vehicle or train 3 therein, provides what is in effect a cushioned roadbed permitting safe travel of the train at ultra-high speeds (up to 700 m.p.h.) without undue noise, vibration or shock. With the duct 1 of smaller cross section than the outer tube 5, and floated in liquid 9 in the outer tube 5, a phenomenon which I refer to as "dynamic flotation" occurs on high-speed passage of a train which causes the duct 1 to settle in the liquid 9 under the weight of the train much less than would be expected. Thus, the flotation of the duct 1 in the liquid 9 in the outer tube 5 provides the cushioned roadbed effect without undue settlement of the duct under the weight of the train passing therethrough. This dynamic flotation phenomenon occurs on high-speed passage of a train due to lag in displacement of the liquid 9 longitudinally of the outer tube 5, noting that on settlement of the duct 1 in the liquid under the weight of the train, the liquid displaced on such settlement rises in the outer tube and tends to flow longitudinally in the outer tube to seek its normal level. However, due to the fact that the train (traveling at high speed) is present at any given point for only a very brief interval (of the order of one second at speeds contemplated by this invention), also due to the fact that since the train is of considerable length the displaced liquid must travel a relative long distance longitudinally in the outer tube 5 to attain its normal level, and further due to the fact that the cross section of the regions in which the liquid is confined is such as to increase skin friction and viscosity effects thereby to impede free travel of the liquid longitudinally in the outer tube, the displaced liquid tends to remain at a considerably higher level than the normal liquid level, resulting in considerably less actual settlement of the duct 1 in the liquid than would occur under static conditions (i.e., with the train stationary). The higher-than-normal level of the liquid on passage of a train and the relatively small amount of settlement of the duct 1 may be observed from FIG. 4 and a comparison thereof with FIG. 3.

Considering, for example, the case of a cylindrical duct 1 nine feet in outside diameter weighing 750 lbs. per foot, floating in water in a cylindrical outer tube 5, ten and one half feet in diameter, and a loaded train 3 weighing 500 lbs. per foot, the duct 1 per se would float with its bottom approximately 27 inches deep in the water. The loaded train, if stopped in the duct, would cause it to settle an additional 12 inches. However, in the case of a train traveling through the duct at high speed, and with the stated duct and outer tube cross sections, the water will rise 9½ inches in the outer tube and the duct will settle only 2½ inches, constituting a flotation factor of 2½ to 9½ or about ¼. This flotation factor essentially corresponds to the ratio of the width of free liquid surface to the length of the chord measured across the duct at the level of the liquid. Any desired flotation factor may be achieved by selection of appropriate diameters for the duct and outer tube in relation to the liquid level. Under certain circumstances, it may be desirable to provide suitable means for further impeding the longitudinal displacement of the liquid in the outer tube to increase the dynamic flotation effect, particularly if train speed is to be in the lower ranges herein contemplated. Such means may, for example, take the form of flexible, porous transverse dams or baffles at suitable intervals spaced longitudinally in the outer tube 5 to impede the longitudinal flow of liquid in the outer tube. Or, the viscosity of the liquid may be increased in suitable manner to make it flow less readily, or a relatively high viscosity liquid or semiliquid may be selected.

In conjunction with the dynamic flotation phenomenon, it should be observed that the forward end portion of the train is in effect continuously traveling uphill (due to the settlement of the duct 1 under the weight of the train) to a degree which is a function of the amount of settlement of the duct (though not the total amount of immersion of the duct in the liquid). Conversely, the rear end portion of the train is in effect continuously traveling downhill (due to the tendency of the duct 1 rearward of the train to rise upward to its normal level). At higher speeds, there may be a tendency for the uphill effect and the downhill effect to differ, which would result in sloshing of the liquid and lag in the duct floating back to its normal level until some time after the train has passed, also resulting in a considerable loss of energy from the train into the liquid. However, this sloshing tendency may be controlled or "tuned" in accordance with the timescale of the passing train by suitable selection of the relative diameters of the duct and the outer tube, the density of the liquid, and the viscosity of the liquid. Other facts being equal, it is desirable that liquid of relatively low viscosity be used to avoid hysteresis loss of energy into the liquid, which loss is a function of viscosity.

As noted above, the system of this invention thus contemplates the provision of the wheeled vehicle 3 traveling on rails 17 in the duct 1 which is floatingly mounted in the tunnel or outer tube 5, the vehicle being pneumatically propelled as a free piston through the duct 1 by evacuation of air from the duct ahead of the vehicle and by delivery of pressure air to the duct 1 rearward of the vehicle. Referring particularly to FIG. 2, which shows how evacuation and delivery of air may be accomplished in accordance with the invention, the duct 1 is shown as being provided at spaced intervals throughout its length with retractable bulkheads or gate valves 21 adapted when closed to divide the entire line of the duct into individual sections or blocks B blocked off from another. Each gate valve 21 is adapted to open for unobstructed passage of the vehicle from one section or block B, to the ensuing block B, and then to close when the rear end of the vehicle has passed by the valve. Extending the length of the duct 1 and adjacent thereto is an auxiliary duct 23 adapted to hold propulsive air (at atmospheric or other suitable pressure) to be delivered rearward of the vehicle passing through a block. This auxiliary duct, which may be referred to as a pressure manifold, is interconnected with the vehicle duct 1 at intervals spaced along the length of these two ducts by ports such as indicated at 25 each having an on-off air valve 27 therein. On account of the settlement of the duct 1 in liquid 9, each port 25 includes a flexible connection 29 to the duct (see FIGS. 3 and 4). Each valve 27 is adapted to be opened as the rearward end of the vehicle passes by the respective port 25 to deliver pressure air through the port into the duct 1 at the rear of the vehicle.

At the end of each block B, there is provided a pumping station 31 equipped with an air pump 33, which may be a diesel-engine or electric-motor driven pump, for evacuating the air from the space in duct 1 between gate valves 21 at the ends of the block. For this purpose, there is a connection 35 from the duct 1 to the inlet of the pump, and there may be a connection 37 from the pump outlet to the pressure manifold for delivering air evacuated from the duct into the pressure manifold 23 for maintaining a supply of air at somewhat higher than atmospheric pressure in the manifold. Each pumping station 31, as shown in FIG. 2, may be located underground adjacent the duct 1 and tunnel 5, for proximity of the pump to the duct, access thereto from the surface being via a shaft 39, which provides for delivery and exit of air and installations and maintenance of equipment, and also serves as an emergency exit.

Figure 12:
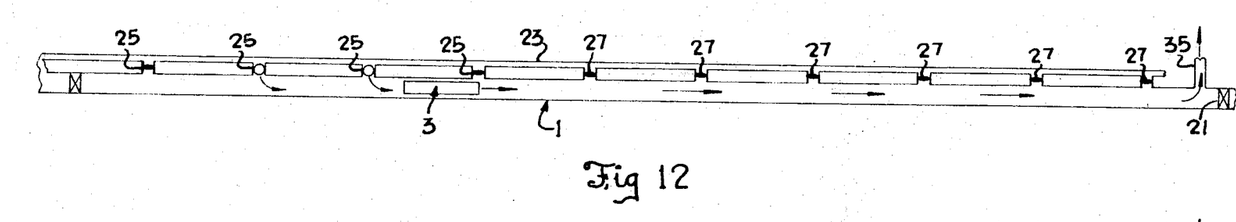
FIG. 12 is a diagrammatic view showing the mode of operation of the system illustrated in FIG. 1.

With the pump 33 in operation, and with valves 27 closed, air is evacuated from the space in duct 1. Pressure in the duct may be reduced down to the order of 1 p.s.i. for vehicle speeds up to 700 m.p.h. As the vehicle approaches the block, the gate valve at the entrance to the block is open, the front end of the vehicle thereby being subjected to the low pressure (e.g., of the order of 1 p.s.i.) in the duct 1. After the rear end of the vehicle has passed into the block, the gate valve 21 at the entrance to the block is closed, whereupon the pump 33 for the preceding block starts evacuating air from the preceding block. As the rear end of the vehicle passes the ports 25, the valves 27 for these ports are successively opened to deliver pressure air at the pressure existing in the pressure manifold 23 into the duct 1 behind the vehicle. This is illustrated in FIG. 12, which shows the vehicle 3 travelling from left to right in a block, the ports 25 immediately to the left of the vehicle open, and the ports 25 to the right of the vehicle closed. Thus, with air in the duct in front of the vehicle at low pressure and air in the duct rearward of the vehicle at relatively high pressure, the vehicle is rapidly propelled as a free piston through the duct. As the front end of the vehicle approaches the exit end of the block, the gate valve 21 at this end of the block is open to permit the vehicle to pass into the next block and, as soon as the rear end of the vehicle passes this gate valve, it is closed, and pump 33 starts to evacuate air from the length of the duct 1 in the block. Each valve 27 is closed as soon as its proportionate share of air has been admitted to the tube 1, depending on the propulsive pressure needed and on the space between valves 27.

The provision of the auxiliary duct or pressure manifold system including ports 25 and valves 27 is advantageous in that it constitutes means for storing pressure air for propulsion of the vehicle very close to the point of use, avoiding any necessity for delivering the considerable amount of propulsive air needed over considerable distances at high speed. While air for replenishing the supply of propulsive air in the manifold 23 after the passage of a vehicle through a block must travel a considerable distance, there in ample time for this after the passage of a vehicle and before the next passage of a vehicle, and the delivery of air to the manifold may be effected over an extended period of time at relatively low air delivery speed.

The ports 25 through which propulsive air is delivered in bursts behind the vehicle 3 passing through the duct 1 may be formed to inject the air directly into the duct. Or the propulsive air may be injected into the duct through aerodynamically shaped entrances. It may be preferable to inject propulsive air into the duct 1 at each injection zone through a plurality of ports spaced around the periphery of the duct, to minimize the tendency of a boundary layer to build up along the wall of the duct, utilizing principles of boundary-layer control known in the aircraft art. It may also be desirable to provide check valves in the pressure manifold to check the reverse flow of air in the manifold. Also as shown in FIG. 2, it may be desirable to provide enlarged chambers 41 for storage of propulsive air along the length of the pressure manifold 23 at each injection zone. This feature enables storage of relatively large quantities of pressure air in close proximity to the injection zones ready for injection into the duct 1, and enables use of a smaller-diameter pressure manifold 23 than would otherwise be required. This feature also reduces the average distance to be traveled by the propulsive air at high speed in being injected into the duct, as well as permitting more economical enclosure of the propulsive air.

Figure 13:
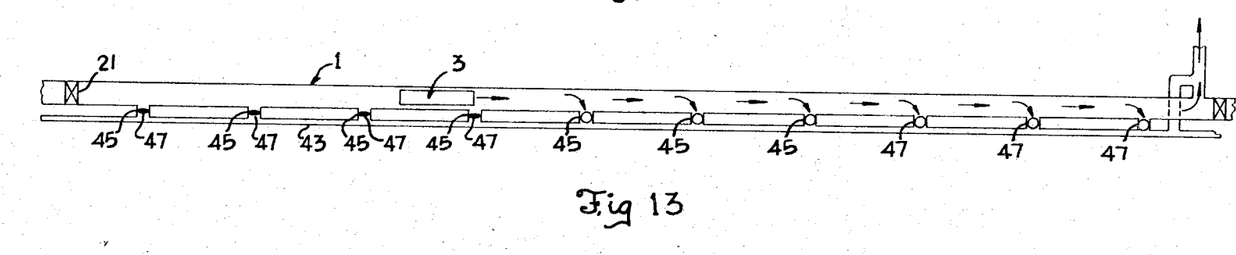
FIG. 13 is a diagrammatic view showing the provision of a system with a vacuum duct or manifold and illustrating its mode of operation.

As shown in FIG. 13, it may also be advantageous to provide a second auxiliary duct 43 extending the length of the duct 1 adapted to be evacuated so that the air pressure therein is of the order of 1 p.s.i. This second auxiliary duct, which may be referred to as a vacuum manifold, is interconnected with the vehicle duct at intervals spaced along the length of these two ducts by ports such as indicated at 45 each having a valve 47 therein. Each of these valves 47 remains open until the rearward end of the vehicle passes, thereby to allow pressure build-up in front of the train to dissipate into the vacuum manifold, and is automatically closed as the rearward end of the vehicle passes thereby so that propulsive air may be held in the duct 1 behind the vehicle.

Figure 8:
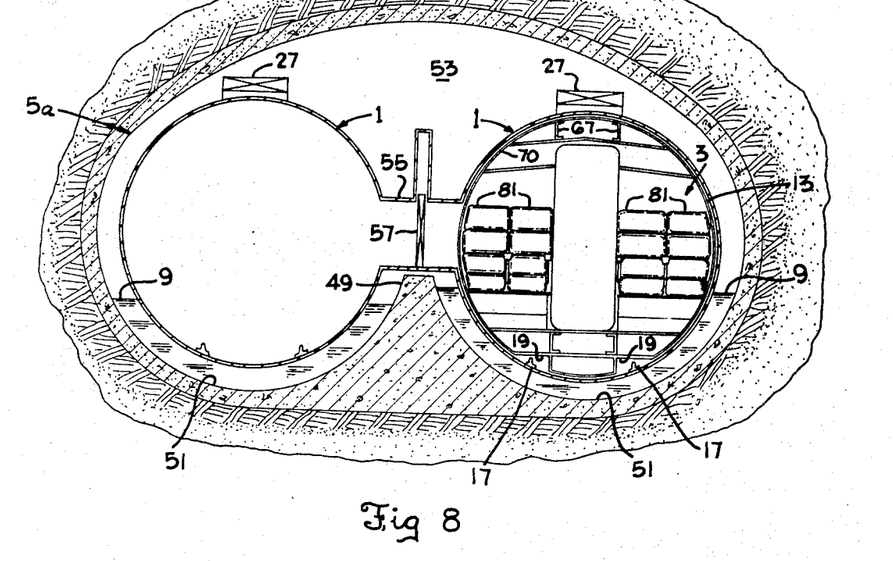
FIG. 8 is a transverse section showing a modification involving a double-track system.
Figure 14:
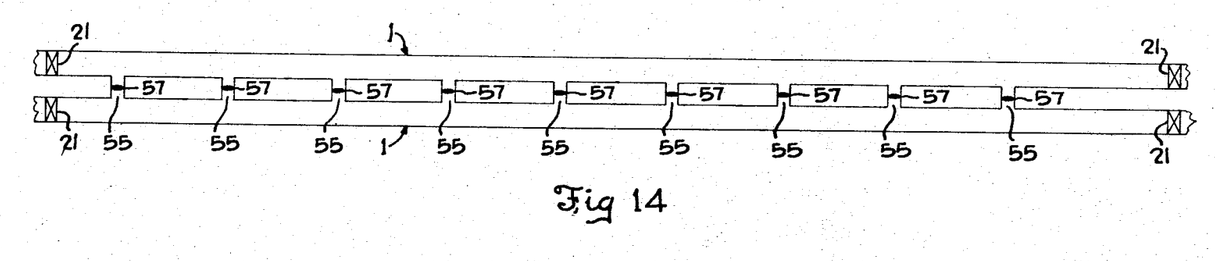
FIG. 14 is a diagrammatic view showing the mode of operation of the double-track system of FIG. 8.
Figure 15:
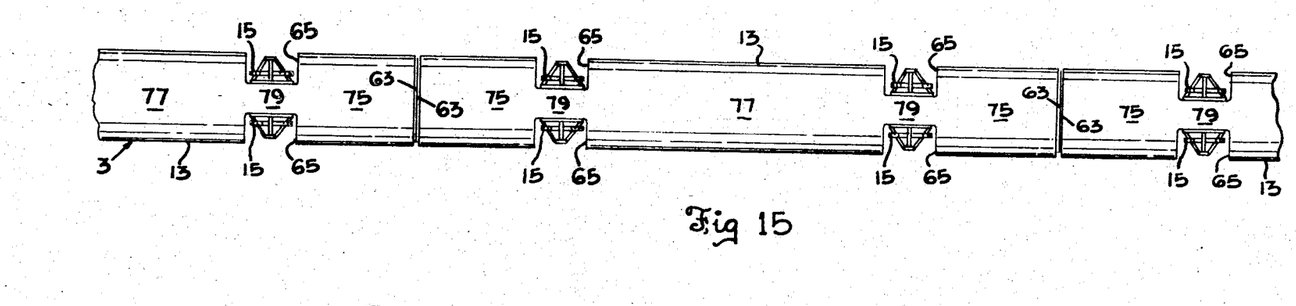
FIG. 15 is a plan of a train of cars of this invention.
Figure 16:
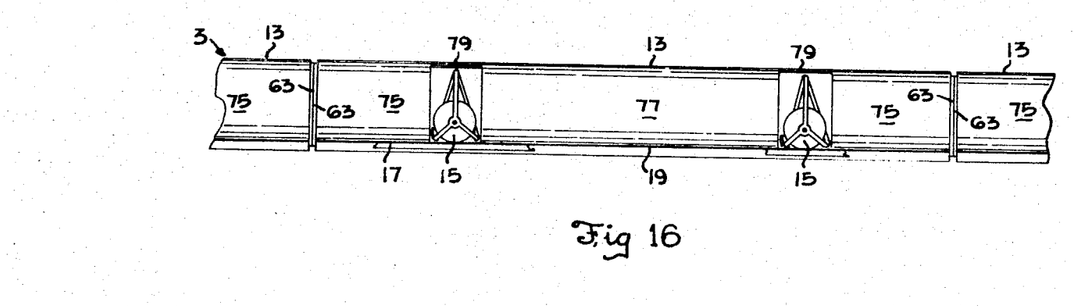
FIG. 16 is a side elevation of FIG. 15.
Figure 17:
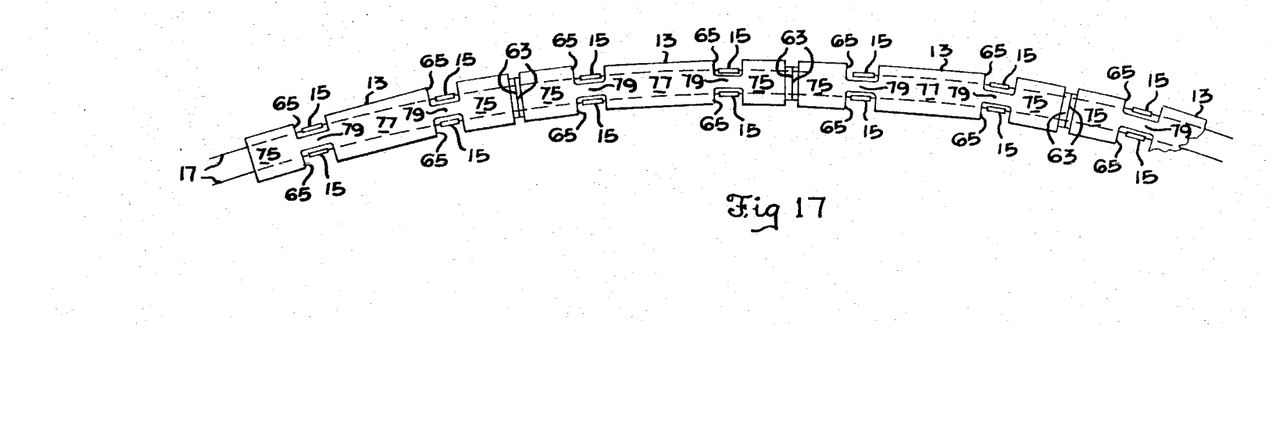
FIG. 17 is a diagrammatic view showing the train of cars traveling around a curve.

FIGS. 8 and 14 illustrate a type of pneumatic system which may be used in conjunction with a pair of side-by-side ducts 1 (a double-track system) for travel of vehicles in opposite directions on the same route. As shown in FIG. 8, it is preferred that in the double-track system, the two ducts 1 be located in the same tunnel 5a, which is constructed to be of double width and provided with a central dividing wall 49 extending part way up from the bottom to provide two side-by-side troughs 51 extending longitudinally of the tunnel for the liquid 9 for individually floatingly mounting the two ducts in the tunnel. The space 53 in the tunnel may constitute a pressure manifold corresponding to the pressure manifold 23 previously described, and the valves 27 for controlling the bursts of air into the ducts from this space or pressure manifold may be located at spaced intervals along the tops of the ducts. The ducts are cross-connected at suitably spaced intervals along their length by cross-ducts 55, each of which has a valve therein as indicated at 57. In the operation of this type of system, valves 27 are operated in the same manner as valves 27 previously described. As a vehicle passes through one of the ducts, the valves 57 are progressively closed as the vehicle passes thereby, to prevent loss of propulsive air from behind the vehicle. The other duct serves as a vacuum manifold, like the vacuum manifold previously described, to increase the total evacuated volume ahead of a vehicle, to reduce the length of the path that the air ahead of the vehicle must travel in being displaced by the vehicle, and to increase the number and effective area of passages to whatever vacuum pumps are drawing a vacuum in the two ducts at a given time. It is recognized that shortly after a vehicle traveling in one direction passes a vehicle traveling in the opposite direction, the cross-connections 55 are temporarily not useful; however, this is not seriously disadvantageous since, typically, the two vehicles will have completed their acceleration phase, which is the most demanding phase from the power standpoint, before such passage occurs. Moreover, a brief reduction in available power after the vehicles have reached a high cruising speed can be tolerated because of the great kinetic energy of each vehicle.

Figure 9:
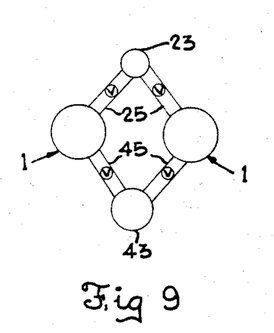
FIGS. 9–11 are diagrammatic views showing various possible alternative duct arrangements.
Figure 10:
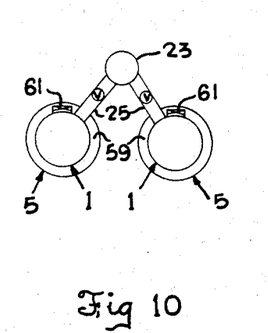
Figure 11:
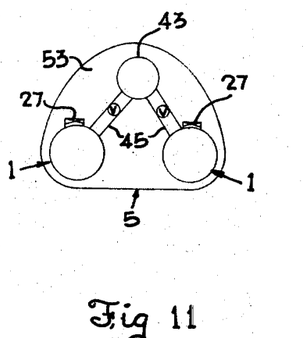

Pressure and vacuum manifolds may be provided in a variety of ways in respect to the vehicle ducts of a double-duct system, as shown in FIGS. 9–11. FIG. 9 shows an arrangement in which the pressure manifold 23 and the vacuum manifold 43 are separate auxiliary ducts extending lengthwise of the two vehicle ducts 1 above and below the latter in the central vertical plane between the ducts, with angled valved connections 25 between the pressure manifold and the ducts and angled valve connections 45 between the ducts and the vacuum manifold. FIG. 10 shows an arrangement with a pressure manifold 23 above two ducts 1 in separate tunnels 5 and angled valve connections 25 between the pressure manifold and the ducts, and with the spaces 59 in the tunnels used as vacuum manifolds, valves such as indicated at 61 being provided at intervals along the length of the ducts. FIG. 11 shows a vacuum manifold 43 in tunnel 5 for two ducts 1 with angled valved connections 45 between the vacuum manifold and the ducts, and with space 53 in the tunnel utilized as a pressure manifold in conjunction with valves 27.

Referring now to FIGS. 15–19, each car 13 of the vehicle or train 13 is shown as being of elongate cylindric form having flat end faces 63 where the cars are rigidly coupled together in end-to-end relation in a manner to be described. At opposite sides of each car, adjacent one of its ends there are two vertical recesses or wheel wells 65 accommodating a pair of the wheels 15, and at opposite sides of the car, adjacent its other end, there are two identical recesses or wheel wells also designated 65 for accommodating another pair of wheels 15. As shown in FIGS. 4 and 8, the car is built up around a frame including a pair of upper frame members 67 and a pair of lower frame members 69 extending longitudinally of the car. Surrounding these is the shell 70 of the car, which may be fabricated from metal plates, and which is cylindric except for the recesses 19 to accommodate the rails 17 and the wheel wells 65. These are formed by providing rectangular plates 71 (see FIG. 19) having a width corresponding to the desired width for the wells extending vertically between the upper and lower frame members 67 and 69 and by providing plates 73 of part-circular shape which define the sides of each wheel well.

With the two pairs of wheel wells 65 adjacent the ends of the car, the car is in effect divided into end compartments 75 and an intermediate compartment 77, which is longer than the end compartments 75, with narrow connecting sections 79 between the end compartments and the intermediate compartment. The narrow connecting sections 79, which are bounded at the sides by plates 71, constitute passages for access between the compartments. Seats 81 (see FIGS. 4 and 8) are provided in the end compartments and the intermediate compartment on opposite sides of an aisle 83. It will be understood that each car is fabricated so as to be pressure tight and that suitable air conditioning would be provided. A light-weight construction for the car is also desirable.

Figure 18:
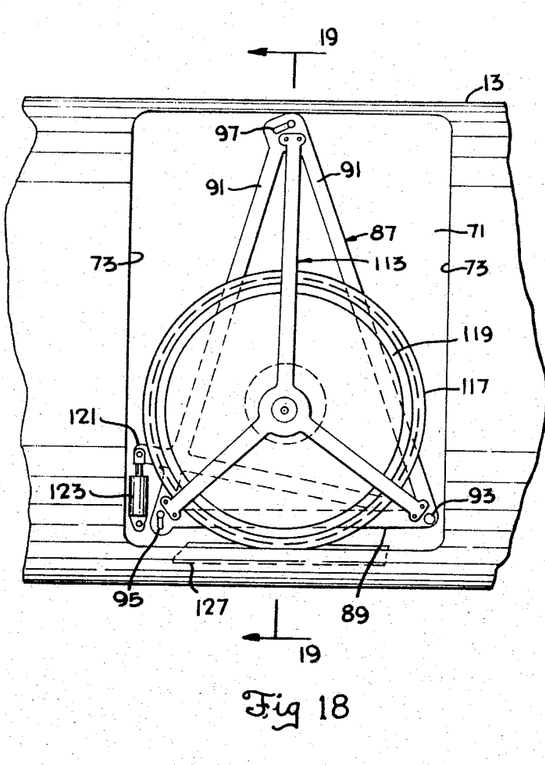
FIG. 18 is an enlarged fragment of FIG. 16, showing details of a wheel mounting.
Figure 19:
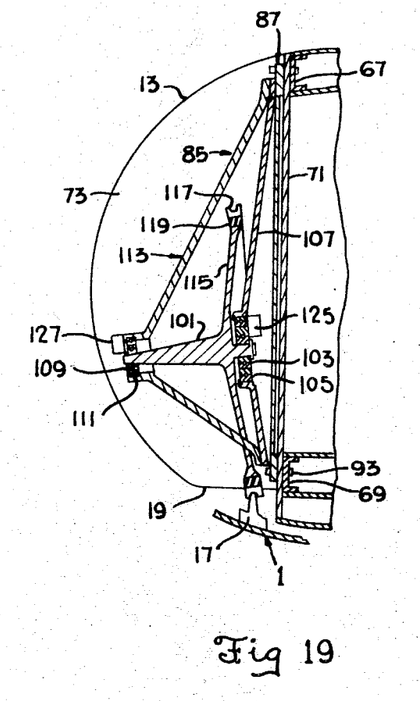
FIG. 19 is a vertical transverse section taken on line 19—19 of FIG. 18.

Each wheel 15 is mounted in its respective wheel well 65 in such manner that it may be raised out of contact with the respective rail 17. As shown in FIGS. 18 and 19, this may be accomplished by journalling the wheel in a suspension indicated in its entirety by the reference numeral 85 adapted to be raised and lowered relative to the car 13. More particularly, suspension 13 is shown as comprising a triangular main frame 87, the base of which is designated 89 and the legs of which are designated 91. This frame, which is flat, is located on the outside of wheel well plate 71, and is pivoted for swinging movement in a vertical plane on the outside of a plate 1 by means of a pivot 93 located adjacent one end of the base 89 of the frame. Pin and slot connections such as indicated at 95 and 97 are provided between the other end of the base 89 of the frame and the plate 71 and between the top of the frame and the plate 71, these pin and slot connections being of such nature as to permit swinging of the frame around the axis of pivot 93 (which is horizontal and transverse to the car 13). The wheel 15 has an axle 101. The inner end of the axle is journalled in two concentric inboard bearings 103 and 105 in an inboard subframe 107 mounted on frame 87, and the outer end of the axle is installed in two concentric outboard bearings 109 and 111 in an outboard sub-frame 113 mounted on frame 87. The wheel itself, which may be of relatively large diameter to accommodate high-speed travel, comprises a dished disk 115 having some capability of flexing and a double-flanged steel rim 117 with a cushioning resilient insert 119 of rubber or the like between the rim and the disk to absorb shocks and to suppress noise and vibration. The flanges of the rim 117 ride on opposite sides of track 17. The concentric inboard bearings 103 and 105 are located in the plane of the rim and receive most of the wheel load, the concentric outboard bearings 109 and 111 functioning primarily to stabilize the wheel. The arrangement is such as to assure positive alignment and to permit lateral rim loads to be reacted without high bearing loads.

For raising the wheel 15 out of contact with track 17, the frame 87 has an extension 121 to which is connected a power-operated jack 123, which is mounted in the wheel well on the outside of plate 71. Jack 123 may be of any suitable type, electrically or hydraulically powered, and is adapted on operation thereof to swing the entire wheel suspension 85 around the pivot 93 to lift the wheel 15 to raise it out of contact with the track. This is for the purpose of complete safety in the event of failure of either of the two sets of bearings 103, 105 and 109, 111 such as would result in freezing of the wheel. In this regard, it will first be noted that the tendency for such failure is minimized by providing a dual inboard bearing and a dual outboard bearing, so that the angular velocity of the wheel is apportioned among the bearings. This avoids undue angular velocity of any one bearing, reducing rolling friction as to any given bearing and minimizing heating. By making each bearing of a set such that it may at least briefly carry the entire wheel angular velocity imposed on the set, it is possible, upon failure of one bearing of the set to raise the wheel out of contact with the rail before the other fails. As shown in FIG. 19, sensors 125 and 127 are provided for each set of bearings 103, 105 and 109, 111, adapted to detect failure of either bearing of each set, and transmit a signal in such event to a staff person on the train who would immediately operate the jack to raise the wheel out of contact with the rail before the other bearing of the set fails. These sensors may be of a known electromagnetic type which in response to decrease in speed of a bearing race transmit an electrical signal. It is contemplated that the jack may be operated automatically in response to such signal.

It will be observed that with the cars of the train rigidly interconnected at their ends as previously noted, it is possible to raise any one or more wheels of a car without disabling the entire train, which, after the raising of a wheel, may proceed on to its destination, though perhaps at reduced speed. In an emergency of such major proportions that it is necessary to stop the train and hold it stopped while the pressure in the duct is being brought up to atmospheric pressure, it is possible to operate all the wheel jacks to raise all the wheels out of contact with the rails and allow the entire train to "sit down" on the tracks at special shoes provided on the cars close to the wheel wells. These shoes may be made of ablative material for a one-time use in bringing the train to a stop from a relatively high speed, possibly from full speed. The high friction of these shoes on the rails would hold the train stationary while the pressure in the duct ahead of the train is brought up to atmospheric pressure. Another use of the jacks is to level up the cars so that they sit properly and mate end-to-end with one another (noting that there may be difficulties in manufacturing the cars to strict tolerances).

Figure 20:
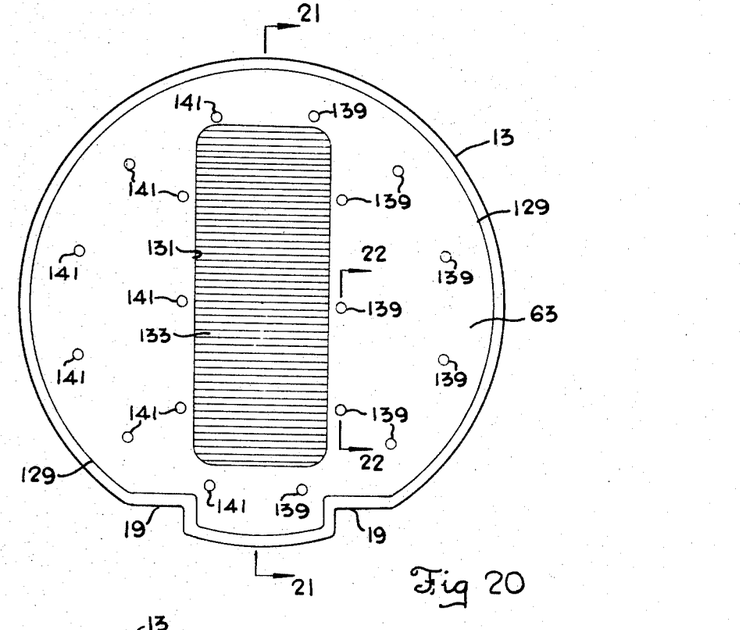
FIG. 20 is an end view of a car.
Figure 21:
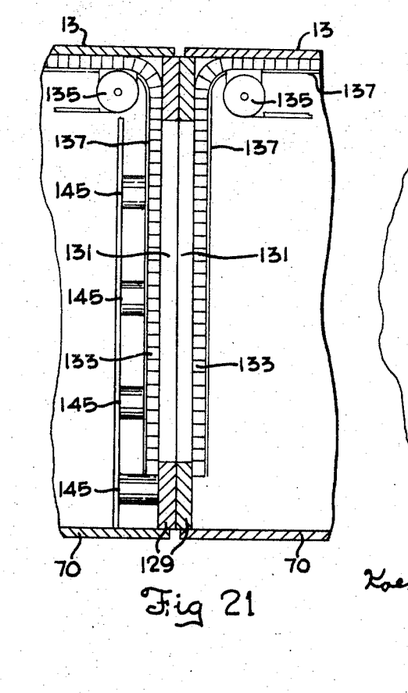
FIG. 21 is an enlarged longitudinal section on line 21—21 of FIG. 20 through the abutting ends of two cars of the train.
Figure 22:
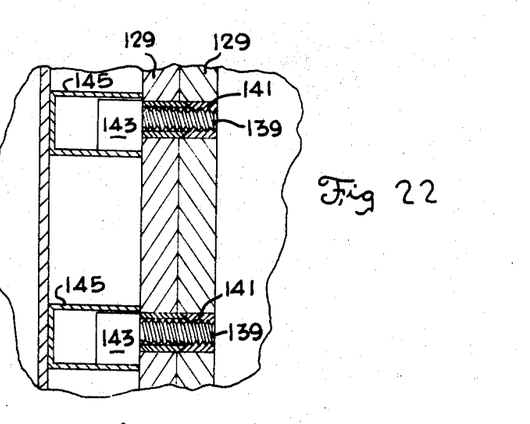
FIG. 22 is an enlarged longitudinal section through the abutting ends of two cars of the train on line 22—22 of FIG. 20, showing how the cars are detachably coupled.

At each end of each car, there is an end plate 129 (see FIGS. 20–22) adapted for face-to-face engagement with the corresponding end plate of the next car in the train. Each of these end plates has a door opening 131 for access from car-to-car and for entrance to and exit from an end car, and a door 133 is provided for the doorway. As shown in FIGS. 20 and 21, this may be a flexible door, adapted to be retracted around a roller 135 at the top. Guideways for the door are indicated at 137. The doors at each end of a car would be constructed to be able to hold 15 p.s.i. internal pressure under emergency conditions. For rigidly and detachably coupling the car at either end to an adjacent car, each end plate or end wall 129 of the car has a plurality of rigid fasteners 139 mounted for extension therefrom and retraction thereinto, and a plurality of sockets 141 for receiving the fasteners extended from the end plate or wall of an adjacent car. As shown in FIG. 22, each fastener comprises a bolt adapted to be rotated by a reversible power drive unit 143 movable back and forth in a housing 145 on the inside of the end wall 129. On turning each bolt in one direction, it is extended from a bushing in the end wall and threads itself into a respective socket 141 in the end wall of the adjacent car, the socket being tapped for screw-threaded rigid interconnection of the end walls in face-to-face relation.

From the above, it will appear that the system of this invention provides for pneumatic propulsion of a high-capacity wheeled vehicle through a duct at high speed, with the power for propelling the vehicle at high speed being generated externally of the vehicle. This wholly external powering of the vehicle is desirable since it eliminates any necessity for on-board equipment for propelling the vehicle (except possibly for light-duty equipment for slow-speed operation of the vehicle at stations or in service yards). The use of a wheeled vehicle traveling on rails is advantageous for a number of reasons, including the high lift-to-drag ratio afforded by wheels (with good bearings), resulting in considerable reduction in power requirements as compared with prior proposed high-speed ground transportation systems, elimination of any necessity for on-board equipment for effecting lift of the vehicle, the precise positioning of the vehicle by the wheels at all speeds regardless of loading (and shifts in loading), the generation of transverse forces required to bend a multiple-car vehicle in traveling around a curve by the action of the rails on the rims of the wheels, and the fact that power can be taken off the wheel axles for operating electrical generators to provide electric power for operating air conditioning equipment, providing illumination, etc. for the vehicle. The floating mounting of the duct 1 is a feature of major significance in that it enables travel of the vehicle at high speed, without undue noise, vibration or shock. It provides a level roadbed at low cost, the roadbed being protected (by the duct) as is desirable for a high-speed system. Where the duct is floated in a liquid, there is also the advantage of simplification of installation of the duct, since the duct may be fabricated in the field section-by-section, its end temporarily capped, and the duct floated into place.

Figure 23:
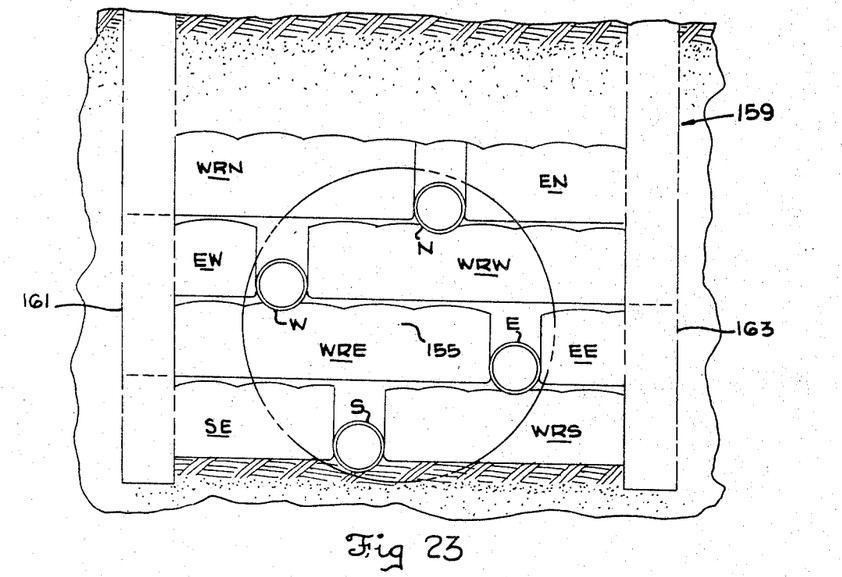
FIG. 23 is a view showing an interchange, in section on line 23—23 of FIG. 25.
Figure 24:
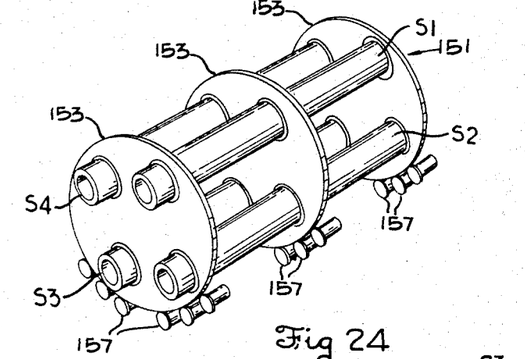
FIG. 24 is a perspective of a turret of the interchange.
Figure 25:
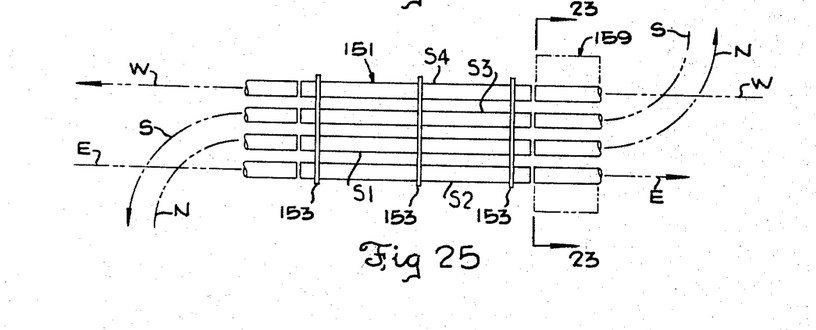
FIG. 25 is a diagrammatic plan of the interchange.

In the case of a junction of two lines (e.g., an East-West line and a North-South line), it is desirable in the interests of rapid transportation that transfer of passengers making connections at the junction be effected quickly and without inconvenience to the passengers. FIGS. 23–25 show an interchange for this purpose. Referring first to FIG. 25, the interchange is shown to occur at the intersection of a dual East-West line and a dual North-South line. The duct for eastbound trains of the East-West line is designated E and the duct for westbound trains of the East-West line is designated W. The duct for northbound trains of the North-South line is designated N and the duct for southbound trains of the North-South line is designated S. At the interchange, these are brought into parallel relation, at different levels, with the four ducts located at the corners of a square, with opposite directions of travel at diagonally opposite corners of the square. In a gap in the ducts at the junction is a rotatable interchange or turret generally designated 151, comprising a support structure comprising three circular plates each designated 153 rotatable on a horizontal axis 155 coincident with the center of the aforementioned square. This support structure carries four tubes or duct segments S1, S2, S3 and S4 for rotation therewith around axis 155. These tubes are located at the corners of a square corresponding to the aforementioned square, the tubes extending parallel to axis 155 equidistantly spaced therefrom and spaced at equal (90°) intervals therearound. The plates 153 are shown in FIG. 24 as cradled in rollers 157 for rotatably mounting the entire turret, and certain of these rollers may be power-driven for rotating the turret. Each tube is journalled in plates 153 for rotation on its own axis. At one end of the turret is a station 159 having a north waiting room WRN, a north exit EN, a south waiting room WRS, a south exit SE, an east waiting room WRE, an east exit EE, a west waiting room WRW, and a west exit EW. Elevator shafts for elevators for servicing these are indicated at 161 and 163.

Each of the tubes S1–S4 is provided with rails and adapted for entry of a car or a number of cars. Assuming, for example, the arrival of a northbound train with cars that are to be transferred to the eastbound and westbound lines, the train will have been initially organized with cars that are to continue north at the front, cars that are to be transferred to the eastbound line next, and cars that are to be transferred to the westbound line last. The train is stopped with the eastbound and westbound cars in the tube which is in line with the duct for the northbound train. These cars are uncoupled from the northbound cars, and the turret is rotated to bring the tube in line with the eastbound duct. The eastbound cars are uncoupled from the westbound cars and moved out of the tube. Then the turret is rotated to bring the tube in line with the westbound duct, and the westbound cars are moved out of the tube. Thus, a rapid interchange (without disentrainment of passengers) may be accomplished.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A high-speed ground transportation system comprising a duct extending between terminals of said system, rails extending lengthwise of the duct along its bottom, a vehicle in the duct having wheels continuously riding on the rails and adapted for propulsion thereof as a free piston in the duct from one terminal to the other by differential air pressure on the ends of the vehicle, valves in the duct at spaced intervals along the length of the duct adapted when closed to divide the duct into individual sections blocked off from one another and adapted to open for unobstructed passage of the vehicle from one section to the next, means for evacuating air from each section, and means for floatingly mounting the duct with respect to the ground providing for cushioned suspension of the duct with respect to the ground substantially throughout its length.

2. A system as set forth in claim 1 wherein the means for floatingly mounting the duct comprises a body of liquid in which the duct is floated.

3. A system as set forth in claim 2 wherein the duct extends through a tunnel, and wherein said body of liquid is confined in the tunnel.

4. A system as set forth in claim 1 wherein the means for floatingly mounting the duct comprises spring means for springingly supporting the duct with respect to the ground.

5. A system as set forth in claim 1 having means for introducing air for propulsion of the vehicle into the duct behind the vehicle at spaced intervals along the length of the duct.

6. A system as set forth in claim 5 wherein said means for introducing air comprises a manifold extending lengthwise of the duct and valved connections between said manifold and duct at spaced intervals along the length of the manifold and duct.

7. A system as set forth in claim 1 having means interconnected with said evacuating means for egress of air from the duct ahead of the vehicle at spaced intervals along the length of the duct.

8. A system as set forth in claim 1 wherein the vehicle comprises a train of cars, each car having wheel wells at its sides toward the ends of the car, said wells extending from top to bottom, the wheels being located in said wells, the cars being rigidly detachably connected together, and the wheel wells providing regions of flexure for curving of the train.

9. A high-speed ground transportation system comprising a tunnel, a body of liquid confined in the tunnel having a level below the top of the tunnel, and a duct adapted for propulsion of a vehicle therethrough at high speed floating in said liquid.

10. A high-speed ground transportation system comprising a tunnel having a generally horizontal reach and at least one sloping reach, a duct adapted for propulsion of a vehicle therethrough at high speed extending through the tunnel, a body of liquid confined in the horizontal reach of the tunnel having a level below the top of the tunnel, the duct floating in the liquid in the horizontal reach of the tunnel, and means for floatingly mounting the duct in the sloping reach of the tunnel.

11. A system as set forth in claim 10 wherein the means for floatingly mounting the duct in the sloping reach of the tunnel comprises spring means for springingly supporting the duct in said sloping reach.

12. A system as set forth in claim 10 wherein the means for floatingly mounting the duct in the sloping reach of the tunnel comprises means for maintaining liquid in said sloping reach with its level below the top of said sloping reach, the portion of the duct in said sloping reach floating in the liquid.

13. A system as set forth in claim 12 wherein the means for maintaining liquid in said sloping reach comprises a series of flexible dams spaced at intervals along the length of said sloping reach.

14. A high-speed ground transportation system comprising a tunnel, means forming two troughs extending lengthwise of the tunnel at opposite sides thereof, a body of liquid in each trough, two ducts extending side-by-side in the tunnel each floated in a respective body of liquid, a vehicle in each duct adapted for propulsion thereof as a free piston in the duct by evacuation of air from the duct ahead of the vehicle, and valved cross-connections between the ducts at spaced intervals along their lengths.

15. A high-speed ground transportation system comprising a tunnel extending underground between terminals of the system, a duct extending through the tunnel, rails extending lengthwise of the duct along its bottom, a vehicle in the duct having wheels riding on the rails and adapted for propulsion thereof as a free piston in the duct by differential air pressure on the ends of the vehicle, means for floatingly mounting the duct in the tunnel providing for cushioned suspension of the duct with respect to the tunnel substantially throughout its length, valves in the duct at spaced intervals along the length of the duct adapted when closed to divide the duct into individual sections blocked off from one another and to open for unobstructed passage of the vehicle from one section to the next, and a series of pumping stations spaced at intervals along said system each including a pump for evacuating air from a respective section.

16. A system as set forth in claim 15 further comprising a manifold extending lengthwise of the duct for holding propulsive air for driving the vehicle under the reduced pressure ahead of the vehicle, and valved connections between said manifold and the duct at spaced intervals along the length of the manifold and duct.

17. A system as set forth in claim 16 wherein each pump is connected to deliver air to the manifold.

18. A system as set forth in claim 16 further comprising chambers for storing propulsive air in communication with the manifold at spaced intervals along its length.

19. A high-speed ground transportation system comprising a duct, rails extending lengthwise of the duct along its bottom, a vehicle in the duct having wheels riding on the rails and adapted for propulsion thereof as a free piston in the duct by differential air pressure on the ends of the vehicle, said vehicle comprising a train of cars, each car having wheel wells at its sides toward the ends of the car, said wells extending from top to bottom, the wheels being located in said wells, the cars being rigidly detachably connected together, and the wheel wells providing regions of flexure for curving of the train.

20. A system as set forth in claim 19 having means mounting each wheel on its respective car for being raised out of contact with the respective rail.

21. A system as set forth in claim 19 wherein each wheel is journalled in a plurality of bearings arranged for continued rotation of the wheel in the event of failure of one bearing, and wherein means is provided for signalling failure of a bearing of any wheel so that the wheel may be raised before failure of other bearings.

22. A system as set forth in claim 19 wherein each car has at each end thereof an end wall for engagement with an end wall of the adjacent car, each end wall of each car having a plurality of rigid fasteners mounted for extension from and retraction into each end wall, and a plurality of sockets, the fasteners of each end wall of each car being extensible into respective sockets of the engaged end wall of the adjacent car for rigidly coupling the cars together end-to-end.

23. A high-speed ground transportation system comprising a duct, rails extending lengthwise of the duct along its bottom, a vehicle in the duct having wheels riding on the rails and adapted for propulsion thereof as a free piston in the duct by differential air pressure on the ends of the vehicle, and means for floatingly mounting the duct with respect to the ground, said means for floatingly mounting the duct comprising a body of a liquid in which the duct is floated.

24. A system as set forth in claim 23 wherein the duct extends through a tunnel, and wherein said body of liquid is confined in the tunnel.

25. A high-speed ground transportation system comprising a tube, a duct extending lengthwise in the tube, rails extending lengthwise of the duct along its bottom, a vehicle in the duct having wheels riding on the rails and adapted for propulsion thereof as a free piston in the duct by differential air pressure on the ends of the vehicle, and means for floatingly mounting the duct within and with respect to the tube providing for cushioned suspension of the duct within the tube substantially throughout the length of the duct, said means comprising spring means for resiliently supporting the duct within the tube.

26. A high-speed ground transportation system comprising a duct, rails extending lengthwise of the duct along its bottom, a vehicle in the duct having wheels riding on the rails and adapted for propulsion thereof as a free piston in the duct by differential air pressure on the ends of the vehicle, and means for floatingly mounting the duct with respect to the ground providing for cushioned suspension of the duct with respect to the ground substantially throughout its length, the vehicle comprising a train of cars, each car having wheel wells at its sides toward the ends of the car, said wells extending from top to bottom, the wheels being located in said wells, the cars being rigidly detachably connected together, and the wheel wells providing regions of flexure for curving of the train.

27. A system as set forth in claim 26 having means mounting each wheel on its respective car for being raised out of contact with the respective rail.

28. A high-speed ground transportation system comprising a tunnel construction, two ducts located side-by-side extending lengthwise in the tunnel construction, a vehicle in each duct adapted for propulsion thereof as a free piston in the duct by evacuation of air from the duct ahead of the vehicle, valved cross-connections between the ducts at spaced intervals along their lengths, and means for floatingly mounting each duct in the tunnel construction comprising a body of liquid in the tunnel construction in which each duct is floated.

29. A high-speed ground transportation system comprising a tunnel construction, two ducts located side-by-side extending lengthwise in the tunnel construction means for floatingly mounting the ducts within and with respect to the tunnel construction, rails extending lengthwise of each duct along its bottom, a vehicle in each duct having wheels riding on the rails and adapted for propulsion thereof as a free piston in its respective duct by evacuation of air from its respective duct ahead of the vehicle, and valved means cross-connecting the ducts at spaced intervals along their lengths, the valved means rearward of a vehicle travelling in either one of the ducts being adapted to be closed to hold air for propelling the vehicle in said one duct behind the vehicle, the valved means ahead of a vehicle travelling in either one of the ducts being adapted to be opened for utilization of the other duct as a vacuum manifold to increase the total evacuated volume ahead of the vehicle.

30. A high-speed ground transportation system comprising a tube, a duct extending lengthwise in the tube, rails extending lengthwise of the duct along its bottom, a vehicle in the duct having wheels riding on the rails and adapted for propulsion thereof through the duct, and means for floatingly mounting the duct within and with respect to the tube providing for cushioned suspension of the duct within the tube substantially throughout the length of the duct, said means comprising spring means for resiliently supporting the duct within the tube.

References Cited

UNITED STATES PATENTS

| | | | |
|---|---|---|---|
| 268,715 | 12/1882 | Needham | 243—19 |
| 825,245 | 7/1906 | Sayer | 104—138 X |
| 1,813,625 | 7/1931 | Knox | 104—155 |
| 2,296,771 | 9/1942 | Crawford, et al. | 104—138 |
| 2,488,287 | 11/1949 | Goddard | 105—345 |
| 3,090,328 | 5/1963 | Berggren | 104—138 |
| 3,100,454 | 8/1963 | Dennis | 104—138 |

DRAYTON E. HOFFMAN, *Primary Examiner.*